Figures 1, 2:
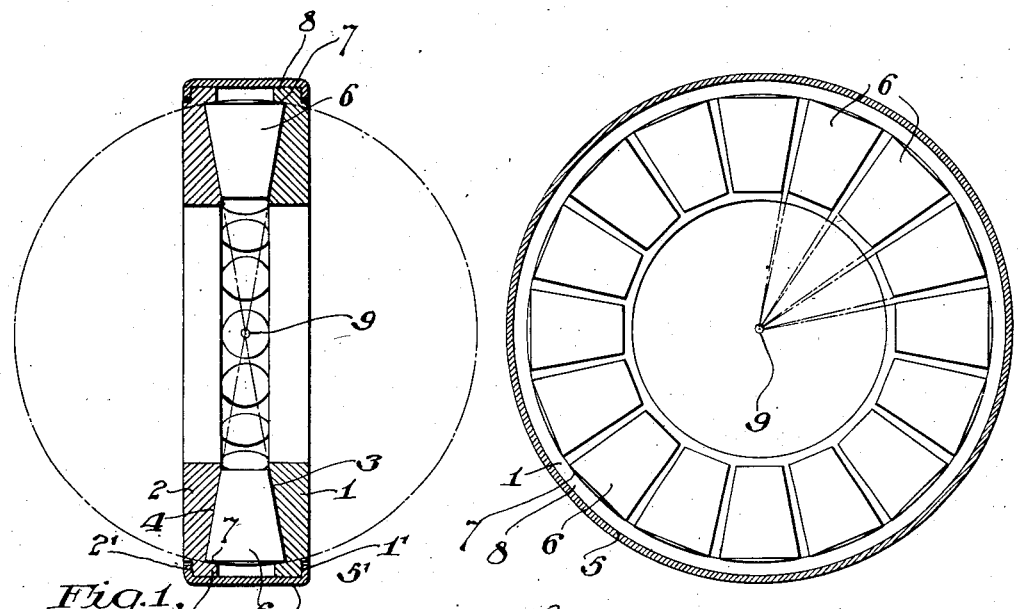

Nov. 15, 1927.

T. V. BUCKWALTER

BEARING

Filed June 4, 1924   3 Sheets-Sheet 1

1,649,285

Inventor:
Tracy V. Buckwalter
By
Attorney.

Nov. 15, 1927.　　　　　　　　　　　　　　1,649,285
T. V. BUCKWALTER
BEARING
Filed June 4, 1924　　　　3 Sheets-Sheet 2
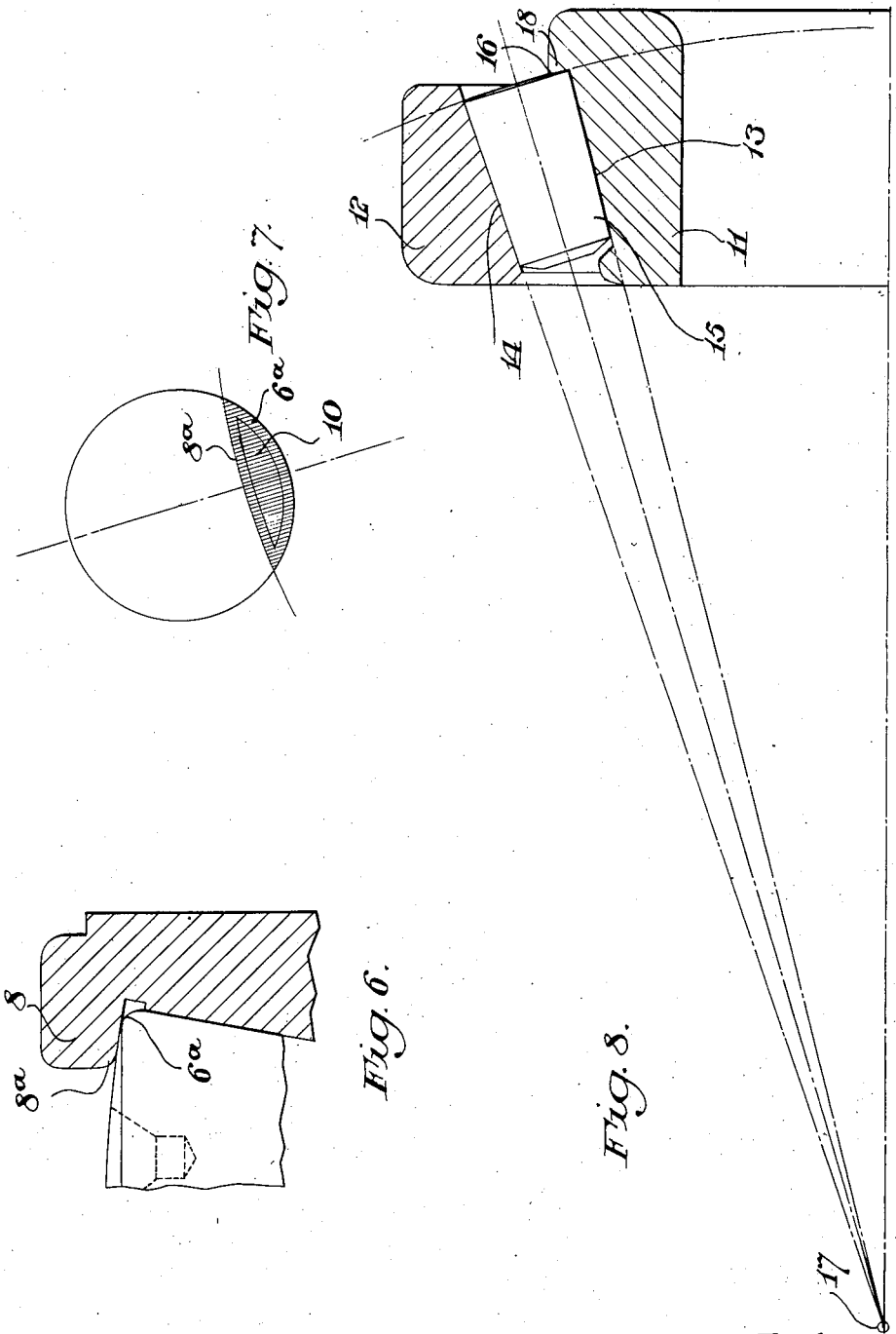
Inventor:
Tracy V. Buckwalter,
By
Attorney.

Nov. 15, 1927.

T. V. BUCKWALTER

BEARING

Filed June 4, 1924      3 Sheets-Sheet 3

1,649,285

Inventor
Tracy V. Buckwalter,
By
Attorney.

Patented Nov. 15, 1927.

1,649,285

UNITED STATES PATENT OFFICE.

TRACY V. BUCKWALTER, OF CANTON, OHIO, ASSIGNOR TO TIMKEN ROLLER BEARING COMPANY, OF CANTON, OHIO, A CORPORATION OF OHIO.

BEARING.

Application filed June 4, 1924. Serial No. 717,742.

My invention is designed to provide an improved anti-friction bearing having such contact between thrust-transmitting and guiding surfaces of bearing rollers and surfaces of thrust-resisting and guiding flanges or ribs coacting with the rollers as to maintain proper axial alignment of the rollers and facilitate the rotation thereof.

I have found that proper maintenance of alignment and true rolling action of the bearing rollers, may be most effectively secured by making the thrust-transmitting roller surfaces, preferably on the outer and larger ends of the rollers, of such contours as to coincide (either entirely or at a plurality of points) with sections of spherical contours generated about a center coincident with the point of intersection of the projected axes of rotation of the rollers and the axis of rotation of the bearing or the projection thereof; the spherical contours or surfaces respectively having radii equal to or approximating the distance between such point of intersection and a point on the thrust-transmitting surfaces of the respective rollers. A thrust-resisting and guiding surface having a contour conforming with the thrust-transmitting surfaces of the rollers is formed upon one or both of the races with which the rollers cooperate, and preferably the rollers are so tapered that the vertices of their generating elements coincide with the point of intersection above specified.
In bearings constructed in accordance with my improvements, the load tends to force the rollers outwardly—away from the point of intersection of their projected axes with the axis of the bearings—and into contact with a pressure-resisting and guiding flange or rib. With the thrust-transmitting surfaces spherically curved about the center and on the radius specified, the entire juxtaposed surfaces will make surface contact and the rollers will be given true rolling motion, without tendency to slide or drag on the flange. Any tendency of a roller to deviate from correct axial alignment results in the roller being forced inward (due to the broad bearing on the flange of the roller end or bearing surface transverse to its axis), thereby increasing the portion of the total load that such roller carries. The normal action of the roller will be to slide outward from under such excess load, and to maintain the extended surface contact at the spherical surfaces and correct axial alignment.

It will be recognized that the radius of the spherical curvature of the roller end and of the guiding and pressure flange may, in some cases, be relatively large compared with the diameter or other dimensions of the roller. Hence for certain purposes, and for convenience in manufacturing, the contours of the juxtaposed thrust transmitting surfaces may, without substantial detriment, be so modified as to form a surface initially coincident at a point or points, but not necessarily at all points, with a true spherical surface generated as above described about a center coincident with the point of intersection of the roller axes (or the vertices of the roller generating elements) with the axis of rotation of the bearing. For instance, the outer and larger end of the roller, instead of being a portion of a true sphere, may be formed by the rotation about the roller axis of a straight line element, provided the angle of the end of the roller with respect to the working surface approximates that of the theoretically correct spherical surface. The generating element forming such modified thrust-transmitting bearing surface is preferably a line at right angles to a radius drawn from the point of intersection above specified to a point in the bearing zone of a roller having a theoretically correct spherical contour, hence the generating element is tangent to or parallel with a tangent to the theoretically correct spherical contour at a point within the bearing zone thereof, and forms an angle relatively to a line perpendicular to the roller axis containing a number of degrees not substantially differing from the number of degrees in the angle formed by the intersection of the arc of the theoretically correct surface with such perpendicular. The point of tangency of such generating element to the theoretically correct surface is preferably such as to effect initial contact of the roller end or thrust-transmitting surface with the guide rib or flange at separated points adjacent to but not at the inner edge of the zone of contact of the theoretical surface, thus giving initially two-point guidance to the roller; but the initial contact may be made at or near the outer edge of the zone of contact of the theoretically correct surface, with resulting initial single point contact: or the initial contact 11 may be made at any points between the inner and outer edges of the contact zone of the theoretically correct surface. In any case, the spot contacts may be worn down to produce a close approximation to the theoretically correct spherical surface contact by comparatively slight service relatively to the life of the bearing.

The characteristic features and advantages of my improvements will more fully appear from the following description and the accompanying drawings of illustrative embodiments thereof.

Figure 3:
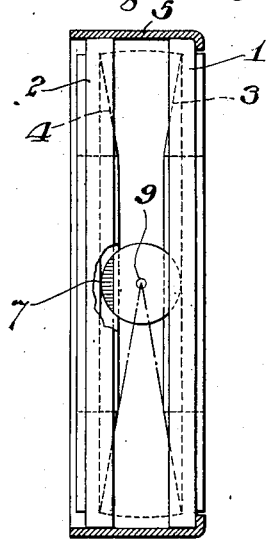
Figure 4:
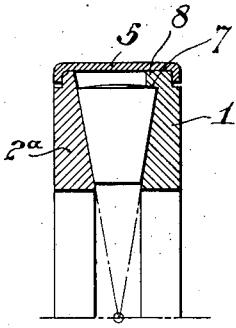
Figures 5, 11:
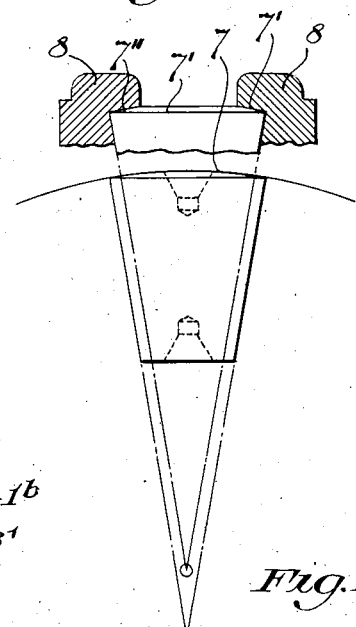
Figure 9:
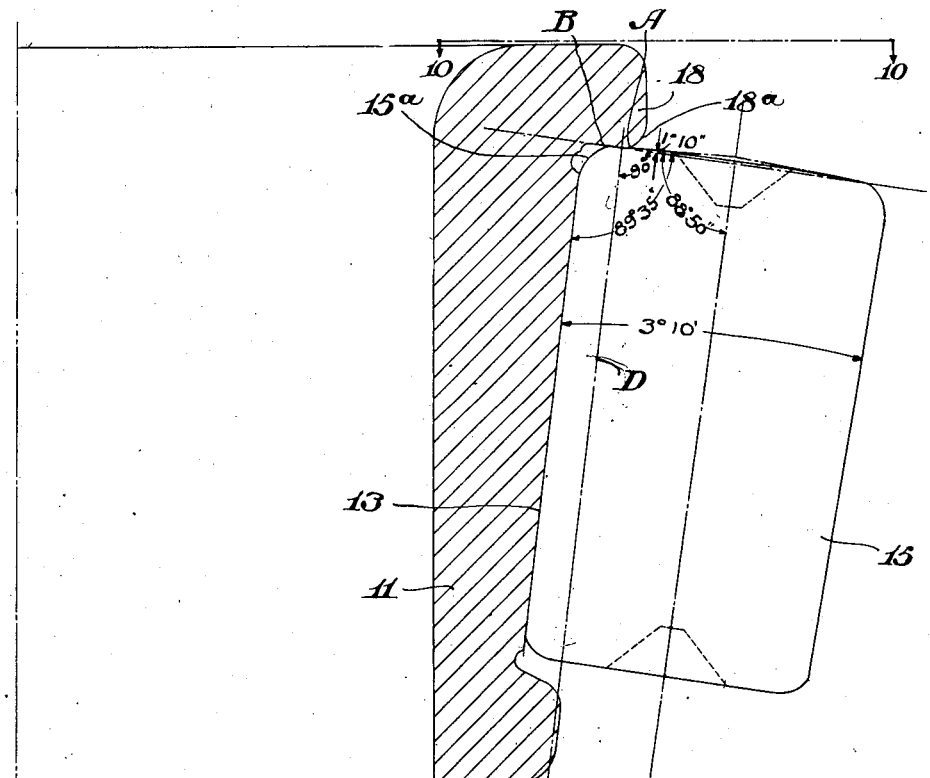
Figure 10:
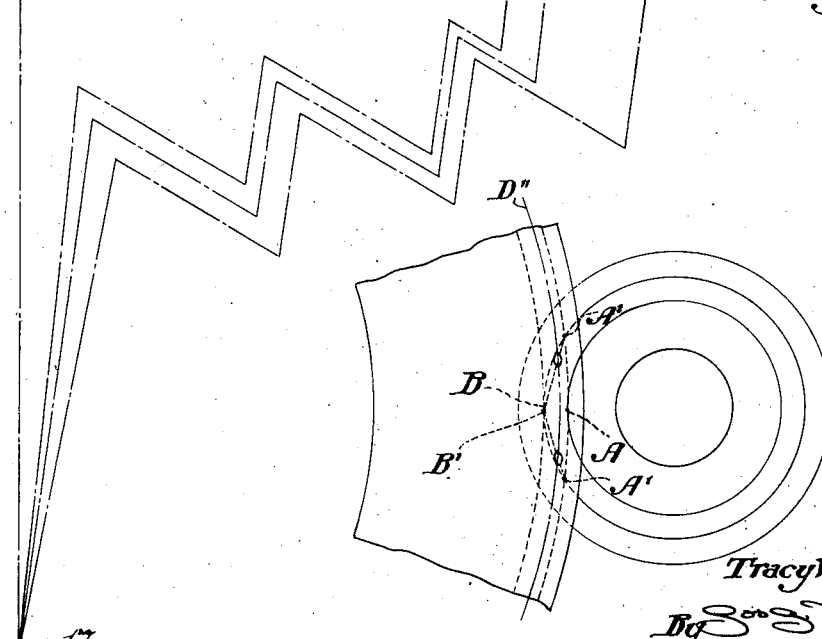

In the drawings, Fig. 1 is a transverse sectional view of a thrust bearing embodying my improvements; Fig. 2 is a transverse sectional view thereof at right angles to Fig. 1; Fig. 3 is a partial side elevation of the same construction with parts broken away to illustrate the surface contact obtained between the end of the roller and the rib; Fig. 4 is a transverse sectional view showing a modified raceway structure; Fig. 5 is a transverse sectional view showing a further modified raceway structure; Fig. 6 is an enlarged fragmentary view illustrating the appearance of a bearing with a radius formed on the edge of the rib and on the edge of the roller; Fig. 7 diagrammatically illustrates the surface contact resulting from the breaking of the edges as shown in Fig. 7, the surface within the light line being the resultant surface contact; Fig. 8 is a transverse sectional view illustrating the application of my invention to a roller bearing having inner and outer race-rings and primarily adapted for carrying radial loads; Fig 9 is a diagrammatic fragmentary sectional view of a roller bearing having thrust transmitting surfaces generated by straight line elements; Fig. 10 is a fragmentary view on the line 10—10 of Fig. 9 and illustrating the initial contact points of the bearing surfaces; and Fig. 11 is a fragmentary view illustrating the adaptation of bearing surfaces having straight line generating elements from the spherical bearing surfaces of a thrust bearing.

As illustrated in Figs. 1 to 3 of the drawings, the similar race rings or disks 1 and 2, provided wth inwardly converging conical raceways 3 and 4, are secured together by a cylindrical peripheral jacket 5 having flanges 5′ engaging the shoulders 1′ and 2″ of the race-rings.

The space between the raceways 3 and 4 is preferably completely filled with conoidal rollers 6 tapering towards the axis of rotation of the bearings, and having the apices of their generating elements and their axes of revolution converging in the axis of rotation of the bearing. While generally unnecessary a cage may, if desired, be employed to space and assist in guiding the rollers.

The raceways 3 and 4 have the same inclinations as the tapering surfaces of the rollers.

The load upon the bearing has a tendency to force the conoidal rollers outwardly, and the rollers are provided with end surfaces 7 for transmitting thrust to the guiding and thrust-resisting flanges 8 formed on the race-rings 1 and 2.

In order to incorporate in the bearing the greatest practicable number of rollers, it is desirable to eliminate the usual cage for separating and guiding the rollers, which necessitates the provision of means for making the rollers self-aligning. This desirerata is attained efficiently by convexly curving the thrust-transmitting surfaces of the roller ends and concavely curving the coacting surfaces of the pressure flanges so as to give them a contour coinciding with the contour of a spherical segment having a center coincident with the point 9 at the intersection of the projected axes of the rollers, the projected generating elements of the rollers, the apices of the projected conical surfaces of the raceways, and the axis of rotation of the bearing. The radius of such spherical contour or surface is equal to or approximates the distance between such point of intersection and the outer end of the roller when in normal position. By so shaping the rollers and flange, the contacting surfaces thereof make full surface contact throughout their overlapping portions, as indicated by the cross-hatching in Fig. 3.

In the modification illustrated in Fig. 4, only one of the race-rings is provided with a pressure and guiding flange, the other race-ring 2ª being made conoidal but plain. This form of bearing may be desirable under certain conditions for greater economy of production and still provides sufficient surface contact at the end of the roller to produce the desired result.

In Fig. 5 is illustrated a modification in which one of the race-rings 2ᵇ comprises a substantially flat washer having a raceway 4′ perpendicular to the axis of the bearing, while the raceway 3′ of the other race-ring 1ᵇ is sharply inclined and provided with a peripheral pressure and guiding flange 8 having a concave surface conforming with the large convex ends of the rollers. The contacting surfaces are coincident with the contour of a segment of a sphere whose center is coincident with the projection of the working face of the flat race, the inclined surface of the conical race, the axes of the rollers and the axis of the bearing. The radius of the spherical segment for each roller is the distance between the point of intersection above referred to and the outer end of the roller when in normal position.

To avoid localization of strain on poorly supported edges, it may be desirable to form the edge of the pressure and guiding flange or rib on a radius and to form the outer edge of the roller on a radius, as illustrated at 8ª and 6ª in Fig. 6, with resulting surface contact between the roller and rib as illustrated by the section 10 within the light lines of Fig. 7.

As illustrated in Fig. 8, my improvements are applied to an anti-friction bearing for carrying radial loads comprising an inner cone or race-ring 11 and an outer cup or race-ring 12 provided with cooperating races 13 and 14 in which conoidal rollers 15 are disposed. The rollers have convex outer ends 16 each coincident with the contour or curved surface of a spherical segment generated about a center 17 formed by the intersection of the apices of the roller generating elements, the axes of revolution of the rollers, and the axis of rotation of the bearing, the radius of the spherical surface or contour for each roller being equal to the distance between such point of intersection and the outer end of such roller when in normal position. The race-ring 11 is provided with a pressure and guiding flange 18 having a concave surface conforming with the curvature of the coacting surface of the rollers. With such construction, the load forces the spherical outer ends of the rollers against the concave surface of the rib 18, with which they make extended surface contact, resulting in the automatic axial alignment of the rollers.

When the radius of the theoretically correct spherical curvature of the end of the roller is comparatively large relatively to the diameter of the roller, the spherical contour of such axial thrust transmitting surfaces may be modified as indicated in Figs. 9, 10 and 11 without substantial detriment to the operation.

In Figs. 9 and 10 there is diagrammatically illustrated a roller bearing similar to that shown in Fig. 8 and comprising a race ring 11 forming a conical raceway 13 in which are seated tapered rollers 15 adapted for cooperation with an outer race-ring (not shown). The outer ends of the rollers 15 transmit axial thrust to the thrust resisting flange or bearing rib 18 of the race-ring 11.

The axes of rotation of the rollers, the vertices of the generating elements of the tapered longitudinal walls of the rollers, and the apices of the conical races all meet at a point 17 in the projection of the axis of rotation of the roller bearing.

In accordance with the principles above enunciated, the axial-thrust transmitting surfaces should coincide with a spherical surface having its center at the point 17, and in the particular construction shown the arc forming the end of the roller would be measured by an angle of 3 degrees 10 minutes. With thrust transmitting surfaces so formed, the width of the contacting zone of the rollers and rib would be the distance between the points A and B, the edge 18ª of the rib being formed on a radius and the edge 15ª of the roller being formed on a radius, as explained in connection with Figs. 6 and 7.

Since, however, the radius of the theoretically correct curvature is very large compared with the diameter of the roll and with the width of the zone of contact between the theoretically correct surfaces, it is practicable to form satisfactory thrust transmitting surfaces generated by straight line elements tangent to the correct surfaces.

To determine such straight line surfaces for the outer ends of the rollers, there is rotated about the roller's longitudinal axis a generating element perpendicular to a radius D drawn from the point 17 to a point in the contacting zone between the points A—B of a surface of theoretically correct contour. As illustrated, the outer end of such radius falls slightly within the border of the zone, and the generating element is therefore tangent to the theoretically correct curved surface at the point D'; hence the initial points of actual contact of the thrust transmitting surfaces lie in the projection of the radius D indicated by the line D'' and at the points of intersection of such projection with the lines A'—B' connecting the extreme points of contact of bearing zones formed on a theoretically correct curvature.

By making the generating element forming the bearing zone a perpendicular to other radii between the points A—B the points of tangency and hence of initial contact of the thrust transmitting surfaces can be varied as desired. It is, however, desirable to have these initial contact points separated as far as possible without having initial contacts made at the extreme edge of the theoretical zone of contact between the roll and rib.

In the particular construction shown by way of example in Figs. 9 and 10, the generating element perpendicular to the radius D makes an angle of 89 degrees 35 minutes with the generating element of the tapered longitudinal wall of the roller and makes an angle of 88 degrees 50 minutes with the axis of rotation of the roller, hence the angularity of the roller end relatively to a plane at right angles to the roller axis is 1 degree 10 minutes.

The thrust resisting surface of the rib 18 will be determined by revolving about the axis of rotation of the bearing the same generating element used in determining the thrust transmitting surface of the roller.

It will be observed that regardless of whether the generating element forming the thrust transmitting surface is so curved as to produce a truly spherical surface as in Figs. 1 to 8 or is a straight line tangent to the theoretically correct surface, as in Figs. 9 and 10, no portion of a projection of the generating element is closer to the center 17 than is the portion of the generating element lying within the limits of the bearing zone A—B of a theoretically correct spherical surface.

Fig. 11 illustrates the modification of the truly spherical surface 7 of the roller of a thrust bearing to form the convex surface 7′ having the straight line elements 7″ making an angle with the roller axis, or with the tapered surface of the roller, approximating that of the theoretically correct spherical surface. The surfaces 8″ of the peripheral pressure and guiding flanges 8 may have the theoretically correct spherical curvature or may be formed with the same straight line elements as the roller ends. In either case, the straight line elements may be worn down to the theoretically correct spherical surface contact with comparatively little wear relatively to the life of the bearing.

By my improvements, the efficiency of the bearing is greatly increased due to reduced friction, the deterioration thereof by wear is greatly diminished, and the manufacturing operations are simplified.

Having described my invention, I claim:

1. In an anti-friction bearing, the combination with races, of rollers respectively having a convex thrust-transmitting and guiding surface coincident at a plurality of points with a spherical contour generated about a center coincident with the point of intersection of the axis of rotation of the bearing with the axes of rotation of the rollers, and a thrust-resisting guiding surface conforming with the thrust-transmitting surfaces of said rollers.

2. In an anti-friction bearing, the combination with inner and outer raceways encircling the axis of rotation of the bearing, of rollers disposed between said raceways and each having a guiding surface coincident at a plurality of points with a spherical contour generated about a center coincident with the intersection of the axes of rotation of the rollers with the axis of rotation of the bearing, and a guiding flange having a surface conforming and contacting with the guiding surfaces of said rollers.

3. In an anti-friction bearing, the combination with raceways, of conoidal rollers disposed between said raceways and tapering to a point in the axis of rotation of the bearing, said rollers each having a convex outer end having a curvature coincident with a spherical segmental contour generated about a center coincident with the point of intersection of the axis of rotation of the bearing with the apices of the projected generating elements of the rollers, and a guiding member having a surface conforming with the end bearing surfaces of said rollers.

4. In an anti-friction bearing, the combination with inner and outer conoidal raceways encircling the axis of rotation of the bearing and having apices meeting at a point in said axis, of tapered rollers disposed between said raceways and having generating elements and axes of rotation converging to the meeting point of said apices in the axis of rotation of the bearing.

5. A roller bearing comprising races in combination with rollers pressed outwardly by said races and each having a thrust transmitting surface coincident with or tangent to a spherical surface having its center at the point of intersection of the axes of rotation of the rollers with the axis of rotation of the bearing.

6. A roller bearing comprising races in combination with rollers each having a thrust transmitting surface generated by the rotation about the axis of rotation of the roller of a generating element coincident with a tangent to a circle drawn about the point of intersection of the axis of rotation of the roller with the axis of rotation of the bearing.

7. A roller bearing comprising rollers each having a thrust transmitting surface formed by a generating element perpendicular to a line drawn from the point of intersection of the axis of rotation of the roller and the axis of rotation of the bearing to a point between the axis and periphery of the roller.

8. In an anti-friction bearing, the combination with inner and outer raceways encircling the axis of rotation of the bearing, one of said raceways being provided with a thrust resisting guiding flange, of tapered rollers having their larger ends adjacent to said flange, said rollers each having a thrust transmitting surface adjacent to said flange and generated by the rotation about the roller axis of a straight line element substantially at right angles to a radius drawn from the point of intersection of the axes of the rollers with the axis of the bearing to the zone of contact of the roller end and flange which would exist if said elements were curved on a spherical contour having its center at said point, the diameter of the roller being relatively small compared with the radius of such spherical contour, and the point of tangency of the generating element to such spherical contour being such as to effect initial contact of the roller end with the flange at separated points, said flange having a thrust resisting surface conforming to the contour of the thrust transmitting surface of the end of the roller.

In testimony whereof I have hereunto set my hand this 29th day of May, 1924.

TRACY V. BUCKWALTER.